US012810757B2

(12) United States Patent
Kim et al.

(10) Patent No.: US 12,810,757 B2
(45) Date of Patent: Nov. 24, 2026

(54) STRETCHABLE DISPLAY DEVICE BASED ON PENTILE

(71) Applicant: UIF (University Industry Foundation), Yonsei University, Seoul (KR)

(72) Inventors: Hyun Jae Kim, Seoul (KR); Ji Yeong Park, Seoul (KR); Won Kyung Min, Seoul (KR); Sun Min Song, Goyang-si (KR); Hye Jin Son, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 19/069,869

(22) Filed: Mar. 4, 2025

(65) Prior Publication Data

US 2025/0285573 A1 Sep. 11, 2025

(30) Foreign Application Priority Data

Mar. 6, 2024 (KR) ........................ 10-2024-0031789

(51) Int. Cl.
*G09G 3/00* (2006.01)

(52) U.S. Cl.
CPC ..... *G09G 3/035* (2020.08); *G09G 2300/0452* (2013.01)

(58) Field of Classification Search
CPC ........................ G09G 3/035; G09G 2300/0452
See application file for complete search history.

(56) References Cited

U.S. PATENT DOCUMENTS

| | | | | |
|---|---|---|---|---|
| 11,335,735 | B2 | 5/2022 | Zhang et al. | |
| 2021/0098555 | A1* | 4/2021 | Kim | H10K 59/121 |
| 2022/0139888 | A1 | 5/2022 | Kim et al. | |

FOREIGN PATENT DOCUMENTS

| | | | | |
|---|---|---|---|---|
| CN | 105469765 | A * | 4/2016 | G09G 3/36 |
| GB | 2592299 | A * | 8/2021 | H10K 59/1213 |
| KR | 10-2021-0082061 | A | 7/2021 | |
| KR | 10-2022-0059284 | A | 5/2022 | |
| KR | 10-2023-0103640 | A | 7/2023 | |
| KR | 10-2023-0123326 | A | 8/2023 | |
| KR | 10-2024-0004207 | A | 1/2024 | |

OTHER PUBLICATIONS

Sung-Hoon Jung et al. "Distribution Density-Aware Compensation for High-Resolution Stretchable Display", Jul. 7, 2022.

* cited by examiner

*Primary Examiner* — Towfiq Elahi
(74) *Attorney, Agent, or Firm* — ZION IP; Byungwoong Park

(57) ABSTRACT

A stretchable display device includes a plurality of unit display areas, wherein each of the unit display areas is composed of a plurality of stretchable display component placement areas, and wherein either a stretchable wiring portion or a pixel portion is arranged in each of the stretchable display component placement areas.

7 Claims, 4 Drawing Sheets

STRETCHABLE DISPLAY DEVICE BASED ON PENTILE

CROSS-REFERENCE TO RELATED APPLICATIONS

A claim for priority under 35 U.S.C. § 119 is made to Korean Patent Application No. 10-2024-0031789 filed on Mar. 6, 2024 in the Korean Intellectual Property Office, the entire contents of which are hereby incorporated by reference.

BACKGROUND

Embodiments of the inventive concept described herein relate to a high-resolution stretchable display device with a PenTile-based pixel arrangement, capable of maintaining high resolution even when the display is stretched.

The inventive concept was derived from the research conducted as part of the Nano Materials Technology Development project (Project Identification Number: 1711181611, Project Number: 2020M3H4A1A02084896, Managing Institution: National Research Foundation of Korea, Research Project Title: Biaxially Stretchable Strain-Adaptive AMLED Display Backplane Materials/Device Technology, Performing Institution: Yonsei University, Research Period: 2024.01.01 to 2024.12.31) supported by the Ministry of Science and ICT. Meanwhile, the Korean government, which is the subject of providing tasks in all aspects of the inventive concept, does not have property benefits for the inventive concept.

Stretchable display devices are a new generation of displays that allow the display screen to stretch elastically, and are still an area that requires a lot of research. Depending on future research developments, the stretchable display devices are expected to be applied in various products, such as wearable devices that attach to the body or clothing, head-up displays embedded in vehicle windshields that subtly expand or contract based on external temperature, and other display devices requiring adjustable screen configurations.

One of the major technical challenges of stretchable display devices is the change in pixel resolution before and after stretching. When a stretchable display is expanded, the number of pixels per unit area decreases, leading to resolution variation. Such resolution changes due to stretching may cause image distortion on the display.

Therefore, high-resolution stretchable display technology is essential to ensure sufficient resolution even when the display is stretched.

SUMMARY

Embodiments of the inventive concept provide a stretchable display device in which the number of pixels per unit area of the stretchable display device is significantly increased to enable the fabrication of a high-resolution stretchable display.

Additionally, embodiments of the inventive concept provide a stretchable display device in which the number of pixels per unit area of the stretchable display device is increased to maintain sufficient resolution even when the stretchable display device is stretched.

According to an exemplary embodiment, a stretchable display device includes a plurality of unit display areas, wherein each of the unit display areas is composed of a plurality of stretchable display component placement areas, and either a stretchable wiring portion or a pixel portion is arranged in each of the stretchable display component placement areas.

In an embodiment, the pixel portion may be arranged in more than half of the plurality of stretchable display component placement areas.

In an embodiment, the stretchable display device may include a first unit display area, and the first unit display area may include a first pixel portion arranged in a first stretchable display component placement area, a first stretchable portion arranged in a second stretchable display component placement area, a second pixel portion arranged in a third stretchable display component placement area, and a second stretchable portion arranged in a fourth stretchable display component placement area.

In an embodiment, the first pixel portion and the second pixel portion may be arranged along a diagonal direction of the unit display area.

In an embodiment, the first stretchable portion and the second stretchable portion may be adjacent to the first pixel portion and the second pixel portion.

In an embodiment, the first stretchable portion or the second stretchable portion may be connected to at least one pixel portion arranged in a second unit display area outside the first unit display area.

In an embodiment, the first pixel portion and the second pixel portion may be connected using a third stretchable portion, and the third stretchable portion may not be arranged in the first stretchable display component placement area to the fourth stretchable display component placement area.

In an embodiment, the stretchable display device includes a gate-in-panel (GIP) and a data line, and the data line may be wired parallel to a horizontal or vertical direction of the stretchable display device.

In an embodiment, the data lines may be configured such that subpixels of a single color are controlled via a single data line.

In an embodiment, the stretchable display device may include a gate-in-panel (GIP) and a data line, and the GIP may be wired parallel to a diagonal direction of the stretchable display device.

In an embodiment, the pixel portion may be configured using a PenTile-type pixel structure.

In an embodiment, the PenTile-type pixel structure may be configured in an RG or BG format.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
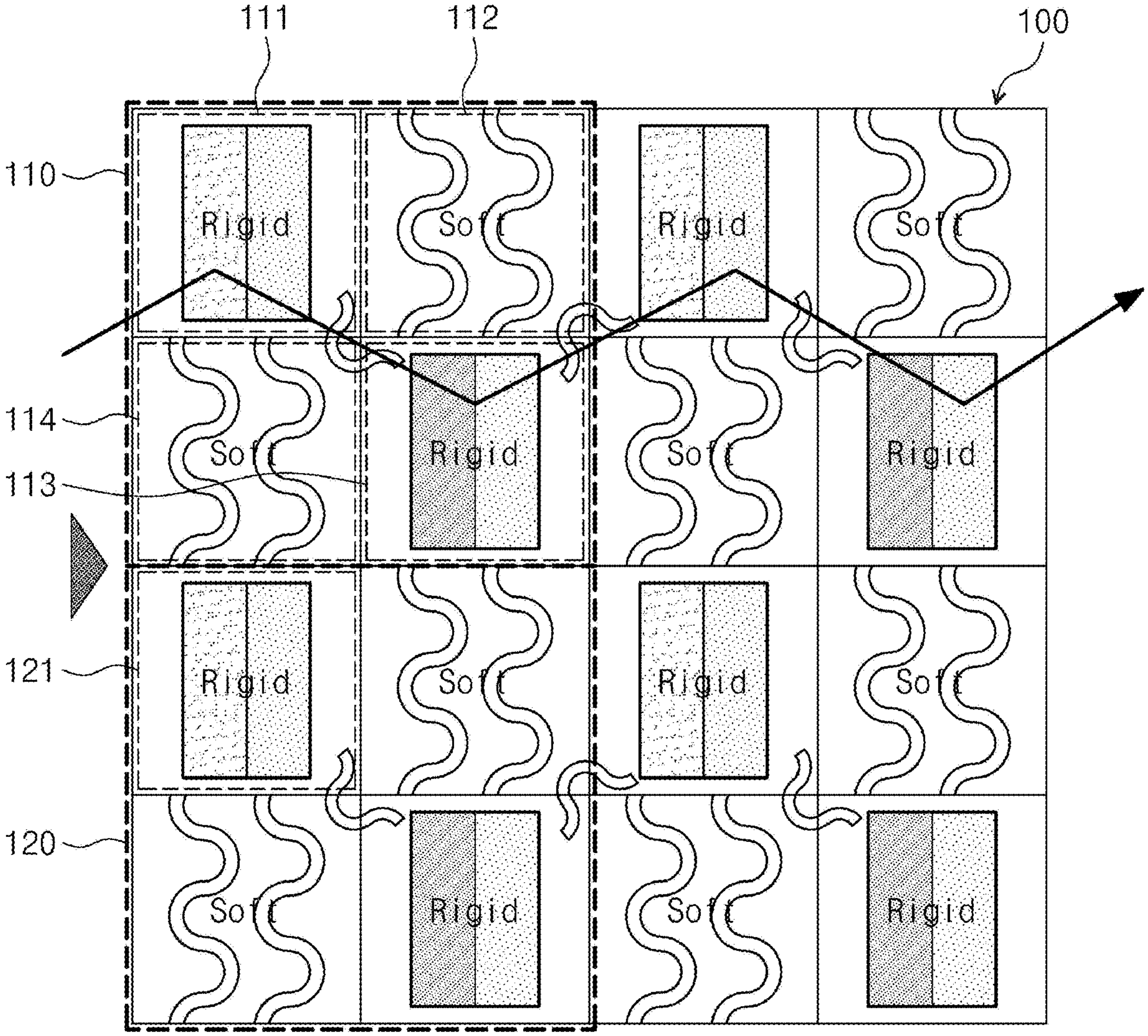
FIG. 1 is a conceptual diagram illustrating a stretchable display according to an embodiment of the inventive concept.

Like reference numerals refer to like elements throughout the specification. The inventive concept does not describe all elements of the embodiments, and general content in the technical field to which the inventive concept pertains or overlapping content between embodiments are omitted. The terms as used throughout the specification, such as “part”, “module”, “member”, “block”, etc., may be implemented in software and/or hardware. A plurality of parts, modules, members, or blocks may be implemented in a single element, or a single part, module, member, or block may include a plurality of elements.

Throughout the specification, when a part is described as being “connected” to another part, this includes cases where they are electrically connected.

Additionally, when a part is described as being “connected” to another part, this includes not only cases where they are directly connected but also cases where they are indirectly connected. Indirect connection includes situations where a completely different structure is interposed between the aforementioned part and the other part.

Also, when a part “includes” or “comprises” an element, unless there is a particular description contrary thereto, the part may further include other elements, not excluding the other elements.

As used throughout this specification, ‘~unit’ is a unit that processes at least one function or operation, and may refer to, for example, a software component, FPGA, or a hardware component. A function provided by ‘~unit’ may be performed separately by a plurality of components, or may be integrated with other additional components. The term ‘~unit’ in this specification is not necessarily limited to software or hardware, and may be configured to reside in an addressable storage medium, or may also be configured to reproduce one or more processors.

Terms such as first and second are used to distinguish one component from another component, and the components are not limited by the above-mentioned terms.

As used herein, singular forms may include plural forms as well unless the context clearly indicates otherwise.

In each step, identification symbols are used for convenience of description and the identification symbols do not describe the order of the steps and the steps may be performed in a different order from the described order unless the context clearly indicates a specific order.

Hereinafter, the operating principle and embodiments of the inventive concept will be described with reference to the attached drawings.

FIG. 1 is a conceptual diagram illustrating a stretchable display according to an embodiment of the inventive concept.

A stretchable display device may be a display device capable of displaying images even when bent or stretched. The stretchable display device may have high flexibility compared to conventional display devices. That is, the shape of the stretchable display device may be freely changed according to the user’s operation, such as bending or stretching the device.

For example, when the user pulls the edge of the stretchable display device, the stretchable display device may be stretched by the force applied by the user. Alternatively, when the user places the stretchable display device on an uneven wall, the device may be arranged to bend along the shape of the wall’s surface. Further, when the force applied by the user is removed, the stretchable display device may return to its original shape.

Referring to FIG. 1, a stretchable display device 100 according to some embodiments of the inventive concept may include a unit display area. In some embodiments, the unit display area may be a structural component of the stretchable display device 100 and may be repeatedly arranged within the device. Preferably, the unit display area may be a minimal structural unit of the stretchable display device 100. Accordingly, in an embodiment, the stretchable display device 100 may include a plurality of unit display areas and additional components to implement a stretchable display.

In some embodiments, the stretchable display device 100 may include a plurality of unit display areas. Referring to FIG. 1, the stretchable display device 100 according to some embodiments of the inventive concept may include a first unit display area 110 and a second unit display area 120. In an embodiment, the first unit display area 110 and the second unit display area 120 may be unit display areas that have the same structure, but are arranged in different areas of the stretchable display device 100.

Referring now to FIG. 1, in some embodiments of the inventive concept, the unit display area may include one or more stretchable display component placement areas. Preferably, the unit display area may be divided and/or organized into a plurality of stretchable display component placement areas. In some embodiments of the inventive concept, elements constituting the stretchable display device 100 may be arranged in the stretchable display component placement areas constituting a unit display area. In one embodiment, the elements arranged may include a stretchable wiring portion for allowing the stretchable display device 100 to be stretched and a pixel portion for displaying the screen of the stretchable display device 100. Preferably, one stretchable wiring portion or one pixel portion may be arranged on one stretchable display component placement area. Referring again to FIG. 1, a pixel portion may be disposed in a first stretchable display component placement area 111 and a third stretchable display component placement area 113 of the first unit display area 110, and a stretchable wiring portion may be disposed in a second stretchable display component placement area 112 and a fourth stretchable display component placement area 114. In a preferred embodiment, a plurality of pixel portions on the unit display area may be arranged along a diagonal direction of the unit display area. Referring to FIG. 1, the pixel portion may be disposed in the first stretchable display component placement area 111 and the third stretchable display component placement area 113, and the stretchable wiring portion may be disposed in the second stretchable display component placement area 112 and the fourth stretchable display component placement area 114 adjacent thereto. More preferably, the pixel portion and the stretchable wiring portion may be arranged such that the pixel portion is placed in more than half of the plurality of stretchable display component placement areas that constitute the unit display area.

In the inventive concept, the pixel portion is a component for displaying a screen of the stretchable display device 100, and may include one or more subpixels. In an embodiment, the pixel portion may be configured to include R, G, and B (Red, Green, and Blue) subpixels. In a preferred embodiment, the pixel portion may have a PenTile-type pixel structure. Referring to FIG. 1, the pixel portion according to some embodiments of the inventive concept may be implemented with a pixel portion with PenTile structure including R (Red) subpixels and G (Green) subpixels in the first stretchable display component placement area 111 and a pixel portion with PenTile structure including B (Blue) subpixels and G subpixels in the fourth stretchable display component placement area 114. In a preferred embodiment, the R, G, and B subpixels included in the pixel portion with PenTile structure may be uniformly arranged. Being uniformly arranged may mean that subpixels of the PenTile structure are arranged such that at least one of the areas, widths, and/or heights of the R, G, and B subpixels are identical to one another.

The stretchable wiring portion, according to some embodiments of the inventive concept, may be a component for connecting different pixel portions in the stretchable display device 100, or for connecting stretchable display component placement areas including different pixel portions. In some embodiments, the stretchable wiring portion may connect different pixel portions in one unit display area, or connect stretchable display component placement areas including pixel portions. Referring to FIG. 1, the first stretchable display component placement area 111 and the fourth stretchable display component placement area 114, which include the pixel portions of the first unit display area 110, may be connected via a stretchable wiring portion. In this case, as shown in FIG. 1, the stretchable wiring portion for connecting the first stretchable display component placement area 111 and the fourth stretchable display component placement area 114 may not be disposed on a separate stretchable display component placement area.

In another embodiment, the stretchable wiring portion may connect different pixel portions included in different unit display areas or display stretchable display component placement areas including pixel portions. Referring to FIG. 1, the first unit display area 110 may connect a pixel portion included in the first stretchable display component placement area 111 with a pixel portion disposed in a first stretchable display component placement area 121 of the second unit display area 120 using the stretchable wiring portion included in the second stretchable display component placement area 112.

The different unit display areas on the stretchable display device 100 may be connected directly or indirectly via stretchable wiring portion. When the first unit display area 110 and the second unit display area 120 are neighboring unit display areas, as shown in FIG. 1, the connection between the first unit display area 110 and the second unit display area 120 may be established via one or more stretchable wiring portions included in the first unit display area 110 and/or the second unit display area 120. In a preferred embodiment, connection between neighboring unit display areas may be established by connecting pixel portions included in different unit display areas or display stretchable display component placement areas including pixel portions via the stretchable wiring portion.

A conventional stretchable display device (panel) has utilized a structure in which stretchable wiring portions are arranged on the top, bottom, left, and right of a stretchable display component placement area in which a pixel portion is arranged. Therefore, compared to a conventional non-stretchable display device, the number of pixels per unit area is inevitably lower. Additionally, when a display device is stretched, the number of pixels per unit area further decreases, making it difficult to provide a high-resolution display. In the arrangement structure of pixel portions in a conventional stretchable display device, at least one of stretchable display component placement areas constituting a unit display area remains as an empty area where neither a pixel portion nor a stretchable wiring portion is placed. Therefore, as disclosed herein, by arranging additional pixel portions in these empty areas, it is possible to increase the number of pixel portions per unit area in the stretchable display device, thereby enabling the implementation of a high-resolution display. Additionally, in the inventive concept, by configuring a pixel portion with a PenTile structure, the number of subpixels arranged within a stretchable display component placement area is reduced compared to a non-PenTile structure (Real RGB method). Consequently, the reduction in subpixel area allows for securing additional stretchability. Thus, it is possible to implement a stretchable display with both high resolution and high stretchability.

Figure 2:
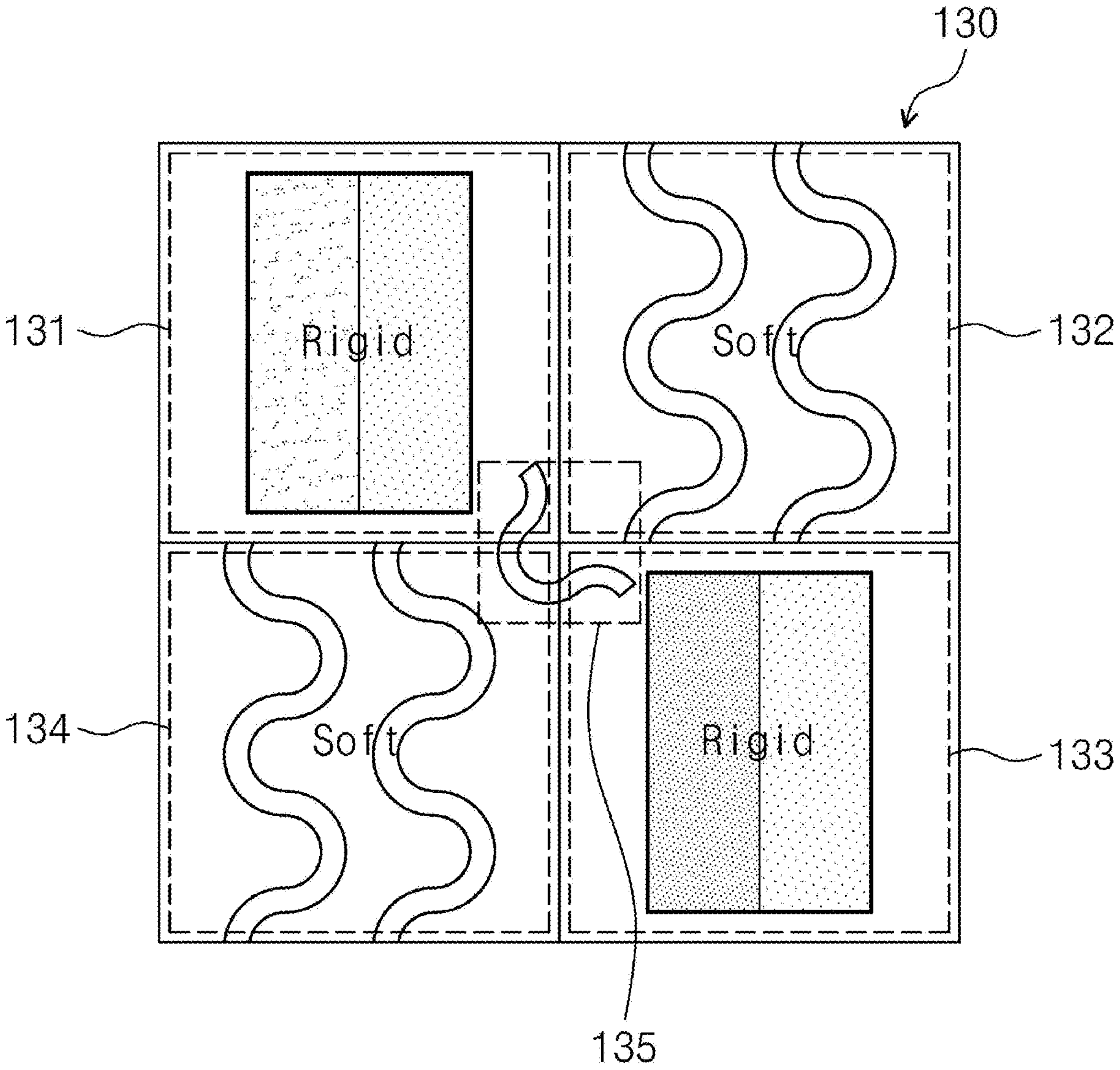
FIG. 2 is a conceptual diagram showing a unit display area according to an embodiment of the inventive concept.

FIG. 2 is a conceptual diagram showing a unit display area according to an embodiment of the inventive concept.

As described above with reference to FIG. 1, a unit display area 130 according to some embodiments of the inventive concept may be divided into a plurality of stretchable component placement areas. Referring to FIG. 2, in some embodiments of the inventive concept, the unit display area 130 may include a first stretchable display component placement area 131 in which a first pixel portion is arranged, a second stretchable display component placement area 132 in which a first stretchable portion is arranged, a third stretchable display component placement area 133 in which a second pixel portion is arranged, and a fourth stretchable display component placement area 134 in which a second stretchable portion is arranged.

As shown in FIG. 2, in some embodiments of the inventive concept, pixel portions may be arranged along the diagonal direction of the unit display area 130. In an embodiment, the first stretchable display component placement area 131, in which the first pixel portion is arranged, and the third stretchable display component placement area 133, in which the second pixel portion is arranged, may be arranged along the diagonal direction of the unit display area 130. Preferably, the first stretchable display component placement area 131, in which the first pixel portion is arranged, and the third stretchable display component placement area 133, in which the second pixel portion is arranged, may be connected using a third stretchable portion 135.

In some embodiments, the third stretchable portion 135 may be a component of the stretchable display device that establishes a connection between pixel portions and/or between stretchable display areas where pixel portions are arranged. Preferably, the third stretchable portion 135 may not be arranged in any of the first stretchable display component placement area 131 to the fourth stretchable display component placement area 134. Additionally, in a preferred embodiment, the unit display area may include a plurality of third stretchable portions. In this case, at least one of the plurality of third stretchable portions may be arranged to establish a connection to a pixel portion arranged in a neighboring unit display area and/or a stretchable display area in which a pixel portion is arranged.

Figure 3:
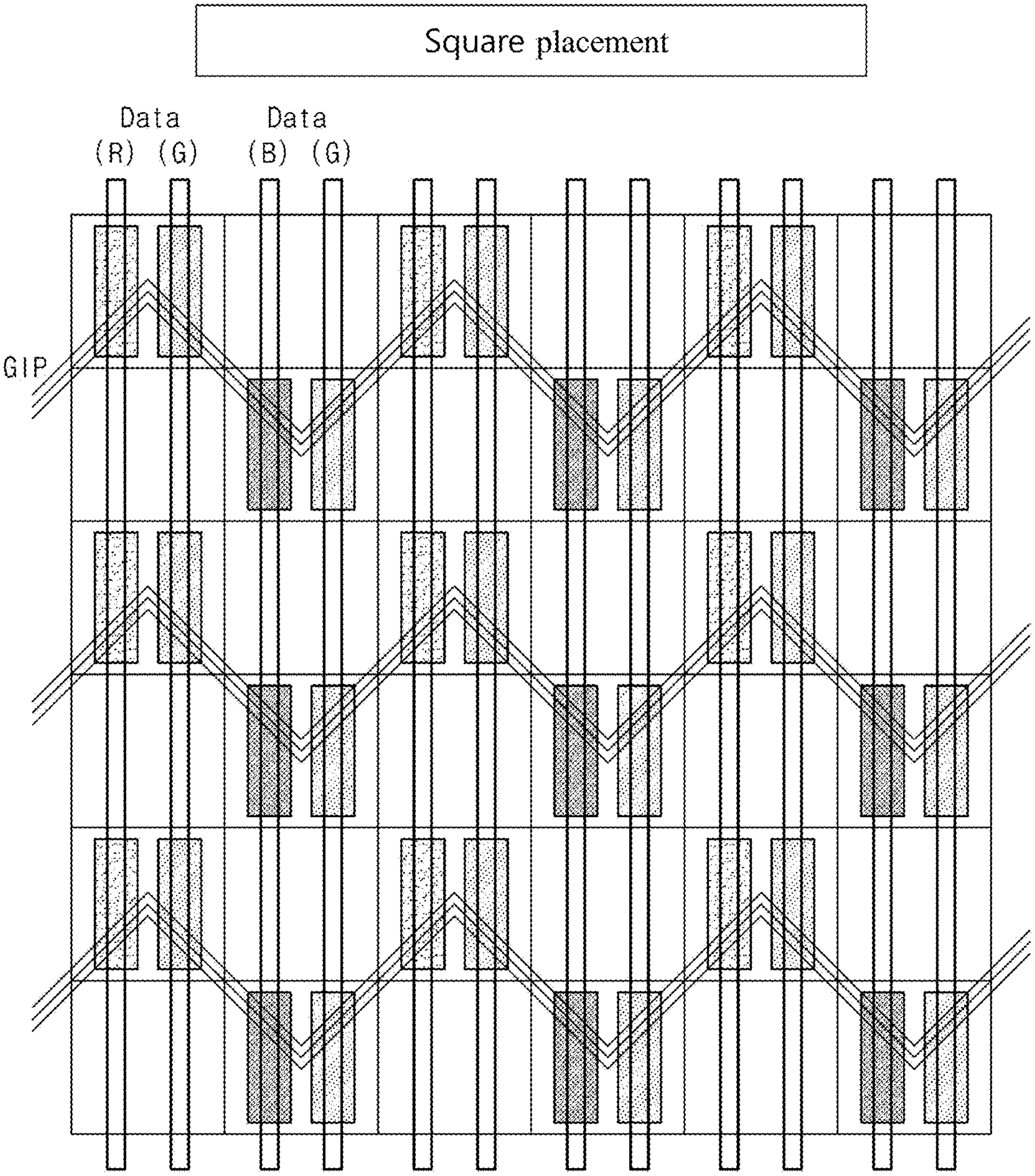
FIG. 3 is a conceptual diagram showing pixel arrangement and wiring of a stretchable display according to an embodiment of the inventive concept.

FIG. 3 is a conceptual diagram showing pixel arrangement and wiring of a stretchable display according to an embodiment of the inventive concept.

A stretchable display device in some embodiments of the inventive concept may further include a gate-in-panel (GIP) and data lines. In some embodiments of the inventive concept, the data lines of the stretchable display may serve as pathways for transmitting data such as color, brightness, and/or contrast from the display controller of the stretchable display to each pixel. In an embodiment, the data lines may be used to control one or more subpixels. Referring to FIG. 3, in some embodiments of the inventive concept, the data lines may be wired parallel to either the horizontal or vertical direction of the stretchable display device. Preferably, as shown in FIG. 3, each data line may be wired to control each subpixel included in the pixel portion of the stretchable display device. In this case, in some embodiments of the inventive concept, the pixel portion of the stretchable display device and/or at least some of subpixels included in the pixel portion may be arranged parallel to the horizontal and/or vertical direction of the stretchable display device.

In some embodiments of the inventive concept, the gate-in-panel (GIP) included in the stretchable display device may include all forms of gate signals necessary for a gate driver circuit that drives gate lines to drive the panel. In an embodiment, the gate driver circuit may include a plurality of switching elements for driving the gate lines. Referring to FIG. 3, the stretchable display device according to some embodiments of the inventive concept may include a GIP arranged in a zigzag pattern.

If each data line is configured to drive subpixels of a single color through the wiring of the pixels and data lines of the stretchable display device shown in FIG. 3, the resolution of the stretchable display device may be variably operated, resulting in improvement in power consumption of the stretchable display device.

Figure 4:
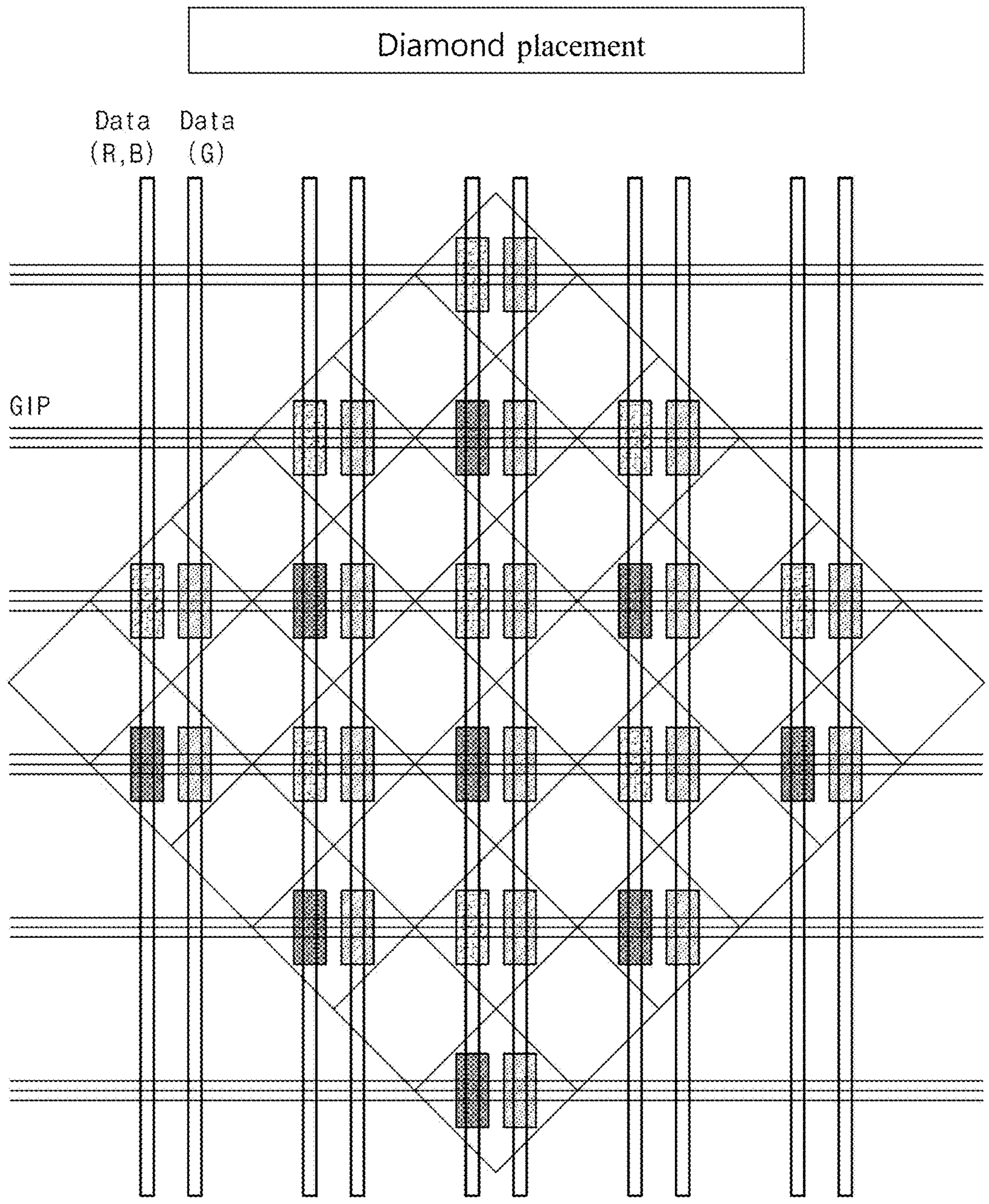
FIG. 4 is a conceptual diagram showing pixel arrangement and wiring of a stretchable display according to an embodiment of the inventive concept.

FIG. 4 is a conceptual diagram showing pixel arrangement and wiring of a stretchable display according to an embodiment of the inventive concept.

Referring to FIG. 4, in some embodiments of the inventive concept, the data lines may be arranged parallel to the diagonal direction of the stretchable display device. In the inventive concept, the diagonal direction may refer to at least one of multiple diagonals that may be made on the plane of the stretchable display device. Preferably, the diagonal direction may refer to any one of the multiple diagonals that may be made on the plane of the stretchable display device. For example, as shown in FIG. 4, the data lines may be arranged parallel to either of two possible diagonals on the stretchable display device. In this case, as shown in FIG. 4, each data line may be wired to control at least two different types of subpixels in the pixel portion of the stretchable display device. Additionally, in this case, the stretchable display device may further include a GIP wired parallel to the diagonal direction of the display. Accordingly, in some embodiments of the inventive concept, the pixel portion of the stretchable display device and/or at least some of subpixels included in the pixel portion may be arranged parallel to the diagonal direction of the stretchable display device.

Through wiring of the pixels and data lines of the stretchable display device shown in FIG. 4, the GIP wired on the stretchable display may be arranged in a straight-line configuration. Furthermore, the spacing between pixel portions placed on the stretchable display may become denser, further enhancing the image quality improvement.

The embodiments of the disclosure have been described above with reference to the accompanying drawings. At least one component may be added or deleted in response to the performance of the components described above. In addition, it will be readily understood by those of ordinary skill in the art that the mutual positions of the components may be changed in response to the performance or structure of the system.

A person skilled in the art to which this disclosure pertains will understand that the inventive concept may be practiced in forms different from the disclosed embodiments without changing the technical idea or essential features of the inventive concept. The disclosed embodiments are illustrative and should not be construed as limiting.

The stretchable display device according to one aspect of the inventive concept may provide a high-resolution image even when the stretchable display device is stretched.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A stretchable display device comprising:

a plurality of unit display areas, wherein each of the unit display areas is composed of a plurality of stretchable display component placement areas, wherein either a stretchable wiring portion or a pixel portion is arranged in each of the stretchable display component placement areas, wherein the stretchable display device includes a first unit display area, and wherein the first unit display area includes:

a first pixel portion arranged in a first stretchable display component placement area;

a first stretchable portion arranged in a second stretchable display component placement area;

a second pixel portion arranged in a third stretchable display component placement area; and a second stretchable portion arranged in a fourth stretchable display component placement area, wherein the first pixel portion and the second pixel portion are arranged along a diagonal direction of the unit display area, wherein the first stretchable portion and the second stretchable portion are adjacent to the first pixel portion and the second pixel portion, wherein the first stretchable portion or the second stretchable portion is connected to at least one pixel portion arranged in a second unit display area outside the first unit display area, wherein the first pixel portion and the second pixel portion are connected using a third stretchable portion, and wherein the third stretchable portion is not arranged in the first stretchable display component placement area to the fourth stretchable display component placement area.

2. The stretchable display device of claim 1, wherein the pixel portion is arranged in more than half of the plurality of stretchable display component placement areas.

3. The stretchable display device of claim 1, wherein the stretchable display device includes:

a gate-in-panel (GIP); and a data line, wherein the data line is wired parallel to a horizontal or vertical direction of the stretchable display device.

4. The stretchable display device of claim 3, wherein the data lines are configured such that subpixels of a single color are controlled via a single data line.

5. The stretchable display device of claim 1, wherein the stretchable display device includes a gate-in-panel (GIP); and a data line, wherein the GIP is wired parallel to a diagonal direction of the stretchable display device.

6. The stretchable display device of claim 1, wherein the pixel portion is configured using a PenTile-type pixel structure.

7. The stretchable display device of claim 6, wherein the PenTile-type pixel structure is configured in an RG or BG format.

* * * * *